(12) United States Patent
Zhao et al.

(10) Patent No.: US 10,862,552 B2
(45) Date of Patent: Dec. 8, 2020

(54) ELECTRONIC DEVICE AND METHOD FOR USE IN NETWORK CONTROL POINT AND CENTRAL PROCESSING NODE

(71) Applicant: Sony Corporation, Tokyo (JP)

(72) Inventors: Xinsheng Zhao, Nanjing (CN); Changshan Chen, Nanjing (CN); Pen-shun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 69 days.

(21) Appl. No.: 16/315,166

(22) PCT Filed: Jul. 11, 2017

(86) PCT No.: PCT/CN2017/092463
§ 371 (c)(1),
(2) Date: Jan. 4, 2019

(87) PCT Pub. No.: WO2018/024081
PCT Pub. Date: Feb. 8, 2018

(65) Prior Publication Data
US 2019/0326960 A1    Oct. 24, 2019

(30) Foreign Application Priority Data

Aug. 2, 2016  (CN) .......................... 2016 1 0625551

(51) Int. Cl.
*H04B 7/0452* (2017.01)
*H04W 52/02* (2009.01)
*H04L 25/03* (2006.01)

(52) U.S. Cl.
CPC ..... *H04B 7/0452* (2013.01); *H04L 25/03331* (2013.01); *H04W 52/0206* (2013.01)

(58) Field of Classification Search
CPC .... H04B 7/0452; H04B 7/024; H04B 7/0456; H04L 25/03331; H04W 52/0206
See application file for complete search history.

(56) References Cited

U.S. PATENT DOCUMENTS

2008/0292012 A1*  11/2008  Kim .................... H04B 7/0691
                                                            375/260
2011/0206154 A1*  8/2011  Ding .................... H04B 7/0634
                                                            375/267
(Continued)

FOREIGN PATENT DOCUMENTS

CN           1933357 A       3/2007
CN         102918780 A       2/2013
(Continued)

OTHER PUBLICATIONS

International Search Report dated Sep. 28, 2017 for PCT/CN2017/092463 filed on Jul. 11, 2017, 9 pages with English translation.

*Primary Examiner* — Walli Z Butt
*Assistant Examiner* — Ryan C Kavleski
(74) *Attorney, Agent, or Firm* — Xsensus LLP

(57) ABSTRACT

Provided are an electronic device and method for use in a network control point and a central processing node. The electronic device for use in a network control point comprises a processing circuit. The processing circuit is used to acquire channel characteristic information of channels between a network control point and one or more neighboring network control points thereof and respective user equipment units, and to acquire service requirement information of the user equipment units served by the respective network control points. The current network control point and the neighboring network control points adopt joint precoding to perform downlink data transmission. The processing circuit determines, according to the service requirement information and the channel characteristic information, the number of transmitting antenna to be used by the network control point and the neighboring network control points.

17 Claims, 8 Drawing Sheets

(56) References Cited

U.S. PATENT DOCUMENTS

| | | | | |
|---|---|---|---|---|
| 2015/0003350 A1* | 1/2015 | Yu | ............... | H04B 7/0452 |
| | | | | 370/329 |
| 2015/0270882 A1* | 9/2015 | Shattil | ............... | H04B 7/0452 |
| | | | | 370/329 |
| 2017/0099658 A1* | 4/2017 | Shattil | ............... | H04B 7/024 |

FOREIGN PATENT DOCUMENTS

| | | |
|---|---|---|
| CN | 104113366 A | 10/2014 |
| CN | 105634571 A | 6/2016 |
| WO | 2016029486 A1 | 3/2016 |

\* cited by examiner

ELECTRONIC DEVICE AND METHOD FOR USE IN NETWORK CONTROL POINT AND CENTRAL PROCESSING NODE

CROSS-REFERENCE TO RELATED APPLICATIONS

The present application is a National Stage Application based on PCT/CN2017/092463, filed on Jul. 11, 2017, and claims the priority to Chinese Patent Application No. 201610625551.6, titled "ELECTRONIC DEVICE AND METHOD FOR USE IN NETWORK CONTROL POINT AND CENTRAL PROCESSING NODE", filed with China National Intellectual Property Administration on Aug. 2, 2016, which is incorporated herein by reference in its entirety.

FIELD OF THE INVENTION

Embodiments of the present disclosure generally relate to the field of wireless communications, particularly to a wireless communication system using massive antennas technology, and more particularly to an electronic apparatus and a method for a network control terminal, as well as an electronic apparatus and a method for a central processing node.

BACKGROUND OF THE INVENTION

The massive antennas technology is key technology used to meet ultra-high-rate requirement in wireless communications. Correspondingly, a network control terminal, such as a base station, of a wireless communication system using the massive antenna technology requires a large number of radio frequency and signal processing modules, resulting in high power consumption, which brings a great challenge for realizing the concept of energy-saving communications. Therefore, it is desirable to increase the energy efficiency of a massive antenna system, that is, to increase the transmitted number of bits per unit energy.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to one aspect of the present disclosure, an electronic apparatus for a network control terminal is provided. The electronic apparatus includes processing circuitry, configured to: acquire channel feature information of channels between a network control terminal and its one or more adjacent network control terminals and user equipment served by respective network control terminals, and service requirement information of the user equipment served by respective network control terminals, wherein, the network control terminal and its adjacent network control terminals perform downlink data transmission using joint pre-coding; and determine, based on the service requirement information and the channel feature information, the numbers of emitting antennas to be used by the network control terminal and its adjacent network control terminals.

According to another aspect of the present disclosure, an electronic apparatus for a central processing node is provided. The electronic apparatus includes: processing circuitry, configured to: acquire channel feature information of channels between network control terminals which are adjacent to each other and user equipment served by respective network control terminals, and service requirement information of the user equipment, wherein, the network control terminals perform downlink data transmission using joint pre-coding; and determine, based on the service requirement information of the user equipment and the channel feature information, the numbers of emitting antennas to be used by respective network control terminals.

According to another aspect of the present disclosure, a method for a network control terminal is provided. The method includes: acquiring channel feature information of channels between a network control terminal and its one or more adjacent network control terminals and user equipment served by respective network control terminals, and service requirement information of the user equipment served by respective network control terminals, wherein, the network control terminal and its adjacent network control terminals perform downlink data transmission using joint pre-coding; and determining, based on the service requirement information and the channel feature information, the numbers of emitting antennas to be used by the network control terminal and its adjacent network control terminals.

According to another aspect of the present disclosure, a method for a central processing node is provided. The method includes: acquiring channel feature information of channels between network control terminals which are adjacent to each other and user equipment served by respective network control terminals, and service requirement information of the user equipment, wherein, the network control terminals perform downlink data transmission using joint pre-coding; and determining, based on the service requirement information of the user equipment and the channel feature information, the numbers of emitting antennas to be used by respective network control terminals.

According to other aspects of the present disclosure, there are further provided computer program codes and computer program products for the methods for the network control terminal and central processing node as well as a computer-readable storage medium recording the computer program codes for implementing the methods.

According to the electronic apparatus and method of the present disclosure, the number of emitting antennas to be used by each of the multiple adjacent network control terminals is jointly determined, based on the service requirement of the user equipment and the channel feature information, enabling optimization of selection of the number of antennas, and facilitating to meet the user requirement.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

Figure 1:
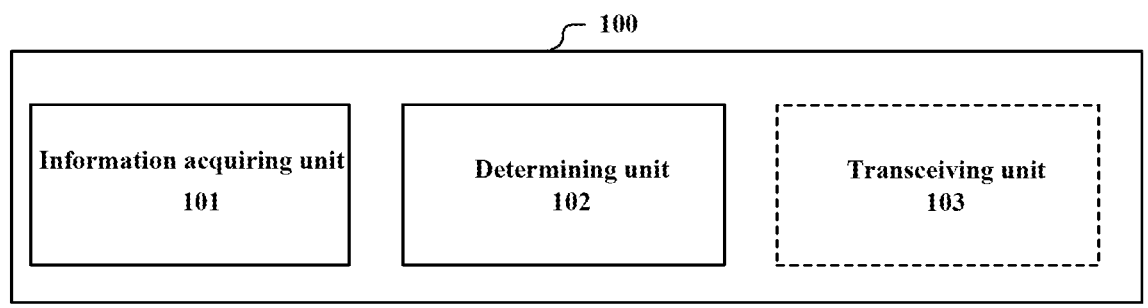
FIG. 1 is a block diagram of functional modules illustrating an electronic apparatus for a network control terminal according to an embodiment of the present disclosure.

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

As described above, in a wireless communication system using the massive antennas technology, power consumption of the radio frequency and signal processing modules at an emitting terminal and a receiving terminal becomes quite high. Therefore, it is required to comprehensively consider optimization of power consumption, and the optimization becomes particularly complex especially in a case that there exist various power consumption models and multiple subsystems are required to be considered.

In addition, a communication system using the massive antennas technology is typically limited by a pilot contamination, i.e., interferences to uplink channel estimation caused by a fact that two communication subsystems perform data transmission using the same pilot sequence. The pilot contamination may be eliminated or suppressed by a method, for example, joint pre-coding, such that the performance of the communication system improves as the number of emitting antennas increases, instead of reaching a certain upper limit.

In this embodiment, an electronic apparatus 100 for a network control terminal is provided for optimizing the number of emitting antennas to, for example, improve energy efficiency of a system and to meet various requirements of user equipment.

The network control terminal refers to an entity in a communication system for implementing functions such as relevant setting, control, and communication resource allocation of communication activities, such as a base station and a small base station in a cellular communication system, a baseband cloud device under a C-RAN (Cloud-RAN/Centralized-RAN) architecture (there may be no concept of a cell), such as any BBU in the BBU pool that is in high speed communication with each other under the C-RAN architecture, or the like. User equipment refers to an entity in a communication system that uses communication resources to achieve its communication purposes, such as a mobile terminal, a smart vehicle, a smart wearable device or the like which has a cellular communication capability. Please be noted that, in some cases, the user equipment can also be a network infrastructure such as a small cell base station or the like.

FIG. 1 is a block diagram of functional modules illustrating an electronic apparatus 100 for a network control terminal according to an embodiment of the present disclosure. The electronic apparatus 100 includes: an information acquiring unit 101, configured to acquire channel feature information of channels between a network control terminal and its one or more adjacent network control terminals and each user equipment, and service requirement information of the user equipment served by respective network control terminals, wherein, the network control terminal and the adjacent network control terminals perform downlink data transmission using joint pre-coding; and a determining unit 102, configured to determine, based on the service requirement information and the channel feature information, the numbers of emitting antennas to be used by the network control terminal and the adjacent network control terminals.

In a case that the network control terminal has multiple antennas, beamforming may be performed to achieve more efficient downlink data transmission. In a time division duplex mode, a downlink beamforming vector may be acquired through an estimation of an uplink channel by taking advantage of a property of uplink and downlink reciprocity of the channel. However, if two network control terminals use the same pilot sequence, the estimation of the uplink channel may be affected. For example, the uplink channel estimation of one network control terminal may be interfered by a user served by another network control terminal and using the same set of pilot sequence, thereby producing the pilot contamination. In order to effectively overcome such kind of pilot contamination, joint pre-coding technology between network control terminals may be used for the downlink data transmission.

As an example, pilot contamination pre-coding (PCP) technology may be used as the foregoing joint pre-coding technology for the downlink data transmission. However, it should be understood that the joint pre-coding technology is not limited to the PCP, and other pre-coding technologies capable of eliminating or suppressing pilot contamination may be used.

In addition, in the present application, the joint pre-coding is performed between the adjacent network control terminals. Here, the adjacent network control terminals may be network control terminals geographically adjacent to each other, and/or network control terminals with interferences produced therebetween go beyond a predetermined degree. Hereinafter, in order to facilitate distinguishing, the above one network control terminal is referred to as the present network control terminal.

In a case that the joint pre-coding technology is used, it is required to interchange channel feature information between the network control terminals to acquire the channel feature information of channels between the adjacent network control terminal and user equipment served by respective network control terminals. The channel feature information is acquired, for example, by the adjacent network control terminal through the estimation of the uplink channel. The user equipment served by respective network control terminals includes the user equipment served by the present network control terminal and the user equipment served by the respective adjacent network control terminals. In addition, the present network control terminal may acquire, by performing the uplink channel estimation, channel feature information of channels between the present network control terminal and the user equipment served by the present network control terminal, and channel feature information of channels between the present network control terminal and the user equipment served by the adjacent network control terminals.

For example, the channel feature information may include one or more of the following: a large scale fading coefficient, a small scale fading coefficient, an angle of arrival for signal, and channel correlation time. The channel feature information may be appropriately selected based on the used joint pre-coding technology. For example, in a case that the PCP pre-coding technology is used, the channel feature information may be a large scale fading coefficient.

In addition, the information acquiring unit 101 is also required to acquire service requirement of the user equipment served by the respective network control terminals. The service requirement of the user equipment is determined and provided by a corresponding network control terminal based on a service request of its user equipment. The service requirement of the user equipment may be, for example, data transmission rate requirement of the user equipment. It should be understood that representation of the channel feature information and the service requirement of the user equipment is not limited to the examples given herein, but may be appropriately selected depending on the actual application.

The channel feature information indicates a state of the channel, and the service requirement of the user equipment indicates requirement for data transmission capability of the channel. Therefore, different states of the channel or different service requirement may require different numbers of emitting antennas. Therefore, the determining unit 102 determines, based on both the service requirement of the user equipment and the channel feature information, the number of emitting antennas to be used by the corresponding network control terminal.

The channel feature information of channels between the adjacent network control terminal and the user equipment served by respective network control terminals, and the service requirement of the user equipment served by the adjacent network control terminal may be acquired through information interchange between network control terminals.

As shown by a dashed line block in FIG. 1, the electronic apparatus 100 may further include a transceiving unit 103. The transceiving unit 103 is configured to receive the channel feature information and the service requirement information of the user equipment from the adjacent network control terminal. The service requirement information of the user equipment may be acquired based on request information transmitted from the user equipment to the respective network control terminals.

In an example, the transceiving unit 103 is configured to receive the above information through signaling for interaction between the network control terminals. For example, in a case of an LTE communication system, the above interaction may be implemented through X2 signaling between base stations.

In addition, the transceiving unit 103 is further configured to transmit, to an adjacent network control terminal, information of the determined number of emitting antennas to be used by the adjacent network control terminal. The transceiving unit 103 may be implemented as an antenna or antenna array and the related signal processing module.

After the information acquiring unit 101 acquires the above various kinds of information and supplies it to the determining unit 102, the determining unit 102 determines, based on the information, the number of emitting antennas to be used. The service requirement of the user equipment served by the present network control terminal and that of the user equipment served by the adjacent network control terminals as well as the channel feature information of the channel between each network control terminal and each user equipment (for example, including the channel between the present network control terminal and its user equipment, the channel between the adjacent network control terminal and its user equipment, the channel between the present network control terminal and the user equipment served by the adjacent network control terminal, and the channel between the adjacent network control terminal and the present network control terminal) are simultaneously taken into consideration, and therefore, the selection of the numbers of emitting antennas may be effectively optimized.

In an example, the determining unit 102 is configured to determine, based on the service requirement of particular user equipment among the user equipment served by each network control terminal and the channel feature information, a minimum number of emitting antennas for each network control terminal; and jointly optimize the numbers of emitting antennas to be used by respective network control terminals according to the minimum number of emitting antennas.

The particular user equipment may be user equipment with the highest priority level among the user equipment served by the corresponding network control terminal. That is, the service requirement of the user equipment with the highest priority level is used as a criterion for calculating the minimum number of emitting antennas. It should be understood that selection of the particular user equipment is not limited thereto, but may be performed based on communication requirement and/or a state of a communication system. For example, the particular user equipment may also be designated user equipment, user equipment with the highest service requirement, or user equipment with the lowest service requirement.

As an example, maximizing an overall energy efficiency of a communication system may be used as a target of the optimizing, and the communication system includes the present network control terminal and its served user equipment as well as the adjacent network control terminals and their served user equipment. By setting the target of the optimizing in this way, the determining unit 102 may determine the number of emitting antennas enabling the overall energy efficiency to be highest.

As another example, maximizing an overall energy efficiency of the user equipment served by respective network control terminals may be used as a target of the optimizing. By setting the target of the optimizing in this way, the determining unit 102 may determine the number of emitting antennas enabling the energy efficiency of the user equipment to be highest.

As yet another example, maximizing an overall energy efficiency of each network control terminal may also be used as a target of the optimizing. By setting the target of the optimizing in this way, the determining unit 102 may determine the number of emitting antennas enabling the energy efficiency of the network control terminal to be highest. It should be understood that it other targets of optimizing may be set according to the actual requirements.

In a case that the joint optimizing is performed, the determining unit 102 may be configured to, under the condition of fixing the numbers of emitting antennas for other network control terminals, optimize the number of emitting antennas to be used by each network control terminal in turn. It should be understood that this is only one example, and other joint optimizing methods may be used to optimize the number of emitting antennas.

In one example, in a case that the PCP pre-coding technology is used, the channel feature information may be a large scale fading coefficient, and the minimum number of emitting antennas is an analytic function of the service requirement and the large scale fading coefficient. In this example, each network control terminal acquires, through estimation of the uplink channel, a large scale fading coefficient of a channel between the network control terminal and each user equipment (including both the user equipment served by the present network control terminal and the user equipment served by the adjacent network control terminal), provides the large scale fading coefficient to the adjacent network control terminal. In addition, each network control terminal also provides the service requirement of its user equipment to the adjacent network control terminal.

Specifically, it is assumed that there are T network control terminals (including the present network control terminal) which are adjacent to each other, each network control terminal serves K user equipment (the K may vary depending on different network control terminals) at the same time, and a $p^{th}$ (p=1, 2, ..., T) network control terminal performs PCP downlink data transmission using $M_p$ antennas, then a downlink achievable rate $R_{kp}$ of the $k^{th}$ (k=1, 2, ..., K) user equipment served by the $p^{th}$ network control terminal may be approximately expressed as:

$$R_{kp} = \log_2\left(1 + \frac{M_p p_d p_u \tau \left|\sum_{m=1}^{T} \beta_{mkp} c_{kmp}\right|^2}{Q_p}\right) \quad (1)$$

$p_d$, $p_u$, and $\tau$ respectively are average emitting power of the network control terminal, uplink emitting power of the user equipment, and a pilot sequence length. $\sqrt{\beta_{mkp}}$ is the large scale fading coefficient of a signal of the $k^{th}$ user equipment of the $m^{th}$ network control terminal to the $p^{th}$ network control terminal. $c_{kmp}$ and $Q_p$ are functions of the large scale fading coefficient related to the $p^{th}$ network control terminal. $c_{kmp}$ is an element on the $m^{th}$ row and the $p^{th}$ column related to the $k^{th}$ user equipment in a constructed PCP pre-coding matrix, and is a function related to the large scale fading coefficient. $Q_p$ indicates an interference item of the signal and is a function related to $p_d$, $P_u$, $\tau$ and the large scale fading coefficient. It can be seen that the achievable rate $R_{kp}$ is a function related to the large scale fading coefficient, the numbers of the adjacent network control terminals, and the number of emitting antennas.

In a case that the service requirement of the user equipment served by the $p^{th}$ network control terminal is represented by the data transmission rate $R^P$, the minimum number of emitting antennas $M_d^p$ required by the $p^{th}$ network control terminal may be acquired by transforming the above formula (1):

$$M_d^p = \frac{(2^{R^P} - 1)Q_p}{p_d p_u \tau \left|\sum_{m=1}^{T} \beta_{mkp} c_{kmp}\right|^2} \quad (2)$$

It can be seen that the minimum number of emitting antennas $M_d^p$ is a function related to the data transmission rate requirement of the user equipment, the numbers of the adjacent network control terminals, and the large scale fading coefficient.

Next, after calculating the minimum number of emitting antennas $M_d^p$ required by each network control terminal, the determining unit 102 performs optimizing of the number of emitting antennas to be used accordingly. Improving the overall energy efficiency as a target of optimizing is taken as an example in the following to describe an optimizing process.

It is assumed that that antenna emitting power of the user equipment is $P_u$, antenna emitting power of the network control terminal is $p_d$, efficiency is $\theta > 1$, radio frequency power of the network control terminal is $p_c$, and other (such as baseband processing) consumption power is $p_o$, for the communication system composed of the T network control terminals and their user equipment, the overall power consumption $p_{total}$ is:

$$P_{total} = T(Kp_u + \theta p_d + p_o) + p_c \sum_{p=1}^{T} M_p \quad (3)$$

Therefore, the overall energy efficiency of the system $EE_{sys}$ is:

$$EE_{sys} = \frac{\left(\sum_{p=1}^{T}\sum_{k=1}^{K} R_{kp}\right) \cdot B}{P_{total}} \quad (4)$$

B is communication bandwidth. The determining unit 102 may optimize the selection of the number of antennas $M_p$ for each network control terminal by maximizing $EE_{sys}$.

As one example, the present embodiment provides a downlink transmit antenna number selection (DOTAN) strategy. In this strategy, in order to effectively meet the service requirement of the user equipment, the minimum number of emitting antennas $M_d^p$ acquired previously would be used as a constraining condition of the strategy (i.e., the actual number of emitting antennas should be greater than the minimum number of emitting antennas), and under the condition of fixing the numbers of emitting antennas for other network control terminals, the number of emitting antennas to be used by each network control terminal is optimized in turn. In other words, for example, for the $n^{th}$ network control terminal to be optimized, the numbers of emitting antennas for other network control terminals are fixed. In a case that n is 1, the numbers of emitting antennas for other network control terminals are fixed to the respective minimum numbers of emitting antennas $M_d^p$, and in a case that n is other natural numbers, for network control terminals that have been optimized among other network control terminals, their numbers of emitting antennas are fixed to their optimized values, and for network control terminals that have not been optimized, their numbers of emitting antennas are fixed to their minimum numbers of emitting antennas $M_d^p$. Subsequently, the number of emitting antennas for the $n^{th}$ network control terminal is changed between its minimum number of emitting antennas and the maximum number of antennas $M_{max}$ possessed by the network control terminal, and the number of antennas that maximizes $EE_{sys}$ is located as the number of emitting antennas to be used by the network control terminal.

In particular, for the case of there being only two adjacent network control terminals, the above DOTAN strategy may be expressed as follows:

Step 1: Let $M_1 = M_d^1$
For $M_2 = M_d^2 : M_{max}$
Look for $M_2 = M^*_2$ to maximize $EE_{sys}$
End For
Step 2: Let $M_2 = M^*_2$
For $M_1 = M_d^1 : M_{max}$
Look for $M_1 = M^*_1$ to maximize $EE_{sys}$
End For Step 2 may be performed before step 1, that is, looking for $M^*_1$ is performed first, and then looking for $M^*_2$ is performed, which is not restrictive.

It should be understood that the above description of the DOTAN strategy is merely exemplary, and the DOTAN strategy is not limited thereto. Instead, various optimizing methods may be used. In addition, although in the description above, improving the overall energy efficiency of the communication system is taken as a target of optimizing, it should be understood that the above description is equally applicable to other targets of optimizing, and only the formula (4) is required to be modified as appropriate.

Figure 2:
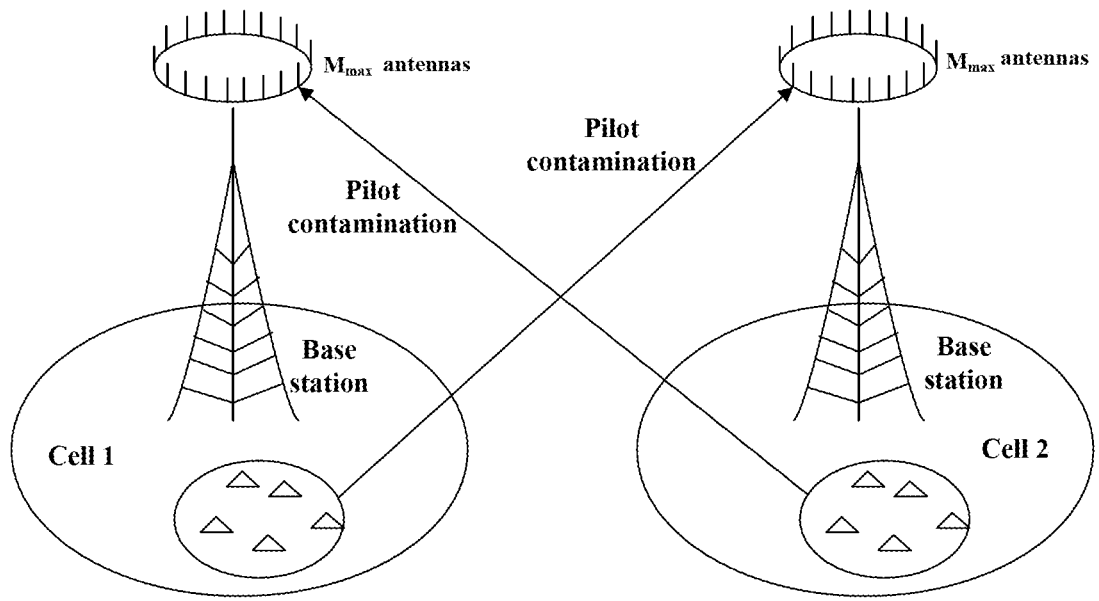
FIG. 2 is a schematic diagram illustrating an example of a distribution of network control terminals and user equipment.

For ease of understanding, FIG. 2 illustrates a schematic diagram of an example of distribution of network control terminals and user equipment, wherein a concept of a cell in a cellular communication system is used. In this case, the network control terminal is, for example, a base station, and the electronic apparatus 100 is, for example, located in the base station or communicatively connected to the base station. However, it should be understood that this is merely exemplary, and the scenarios to which the technology of the present disclosure may be applied are not limited to the case of cell division, but may be any wireless communication system using the massive antennas technology. Furthermore, FIG. 2 shows two adjacent cells, which are not restrictive and there may be three or more adjacent cells.

In FIG. 2, a triangle represents user equipment in a cell, each base station is equipped with $M_{max}$ antennas (for example, 100 or more) respectively, and each cell has K user equipment that are simultaneously served by the base station. In the time division duplex mode, the downlink beamforming vector may be acquired through the estimation of an uplink channel by taking advantage of a property of uplink and downlink reciprocity of the channel. However, if the two cells use the same pilot sequence, the estimation of the uplink channel may be affected. For example, the estimation of the uplink channel in cell 1 may be interfered by users in cell 2 using the same set of pilot sequences, thus resulting in pilot contamination. In order to effectively overcome such pilot contamination, joint pre-coding technology among cells such as the PCP pre-coding, may be used for the downlink data transmission.

In this case, the base stations interchange the channel feature information and service requirement information of the UE through signaling interaction. The electronic apparatus 100 may determine, based on the information as described above, the numbers of emitting antennas to be used by the present base station and the adjacent base station, and provide information of the corresponding number of emitting antennas to the adjacent base station.

As described above, the electronic apparatus 100 of the present embodiment may determine, based on the service requirement of the user equipment and the channel feature information between each network control terminal and each of user equipment, the number of emitting antennas to be used by each network control terminal, and thus can obtain at least one of the following advantages: optimizing the selection of the number of emitting antennas, improving system energy efficiency, and meeting the service requirement of the user equipment. In addition, the above determination of the number of emitting antennas is simple with low calculation load and fast processing speed, and thus is easy to be implemented.

Each of the units in the electronic apparatus 100 may be implemented, for example, by one or more processing circuits, and the processing circuits may be implemented, for example, as a chip.

Second Embodiment

Figure 3:
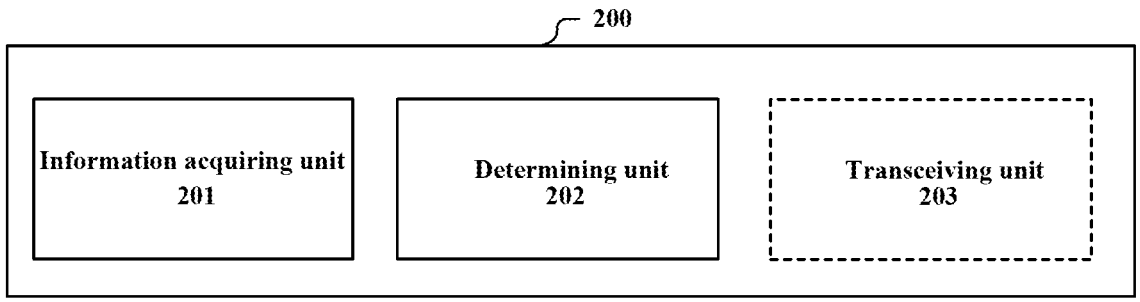
FIG. 3 is a block diagram of functional modules illustrating an electronic apparatus for a central processing node according to an embodiment of the present disclosure.

FIG. 3 is a block diagram of functional modules illustrating an electronic apparatus 200 for a central processing node according to one embodiment of the present disclosure. The electronic apparatus 200 includes: an information acquiring unit 201, configured to acquire channel feature information of channels between network control terminals which are adjacent to each other and user equipment served by respective network control terminals, and service requirement information of the user equipment, wherein the network control terminals perform downlink data transmission using joint pre-coding; and a determining unit 202, configured to determine, based on the service requirement information of the user equipment and the channel feature information, the numbers of emitting antennas to be used by respective network control terminals.

In this embodiment, it is the electronic apparatus 200 on the central processing node which determines the numbers of emitting antennas to be used by respective network control terminals. The central processing node is, for example, communicatively connected to the respective network control terminals within its management range. Each network control terminal is required to report its channel feature information and service requirement information of the user equipment to the electronic apparatus 200. The channel feature information and service requirement are acquired by the corresponding network control terminal, as described in the first embodiment.

As shown by a dashed line block in FIG. 3, the electronic apparatus 200 may further include a transceiving unit 203. The transceiving unit 203 is configured to receive the channel feature information and the service requirement information of the user equipment from the respective network control terminals. In addition, the transceiving unit 203 may be further configured to transmit, to each network control terminal, information of the number of emitting antennas to be used by the network control terminal.

Information transceiving performed by the transceiving unit 203 may be implemented by wireless communications. For example, the transceiving unit 203 may be implemented as an antenna or antenna array and a related signal processing module. The information transceiving may also be implemented by wired communications. For example, the transceiving unit 203 may be implemented as a communication module.

After the information acquiring unit 201 acquires the above information and supplies it to the determining unit 202, the determining unit 202 determines, based on the information, the number of emitting antennas. In one example, the transceiving unit 203 is further configured to provide channel feature information of an adjacent network control terminal of a network control terminal to the network control terminal for use by the network control terminal to perform joint pre-coding. Alternatively, the transceiving unit 203 may also be configured to directly interchange channel feature information between network control terminals. It should be understood that, in this embodiment, since the electronic apparatus 200 on the central processing node performs joint determination of the number of emitting antennas, it is unnecessary to interchange service requirement information between the network control terminals, or even unnecessary to interchange channel feature information.

Similar to the first embodiment, the channel feature information may include one or more of the following: a large scale fading coefficient, a small scale fading coefficient, an angle of arrival for signal, and channel correlation time. The service requirement of the user equipment may be, for example, data transmission rate requirement of the user equipment. Moreover, expression parameters of the channel feature information and service requirement may be selected according to the adopted method of joint pre-coding and the actual requirements.

In the present embodiment, the determining unit 202 may determine the number of antennas in a manner similar to that described in the first embodiment. The description for the determining unit 102 in the first embodiment is also applicable to the determining unit 202, and therefore, the detailed description of the determining unit 202 will be omitted hereinafter.

In one example, the determining unit 202 may determine, based on the service requirement of particular user equipment among the user equipment served by each network control terminal and the channel feature information, a minimum number of emitting antennas for each network control terminal; and jointly optimize the numbers of emitting antennas to be used by respective network control terminals according to the minimum number of emitting antennas.

Exemplarily, maximizing an overall energy efficiency of a communication system may be used as a target of the optimizing, and the communication system includes the respective network control terminals and their served user equipment. Alternatively, maximizing an overall energy efficiency of the user equipment served by each network control terminal may be used as a target of the optimizing. Alternatively, maximizing an overall energy efficiency of each network control terminal may be used as a target of the optimizing.

In a case that the joint optimizing is performed, the number of emitting antennas to be used by each network control terminal may be optimized in turn, for example, under the condition of fixing the numbers of emitting antennas for other network control terminals. Exemplarily, the DOTAN strategy described above may be used.

In one example, the particular user equipment may be user equipment with the highest priority level among the user equipment served by the corresponding network control terminal.

As described above, the electronic apparatus 200 of the present embodiment may determine, based on the service requirement of the user equipment and the channel feature information between each network control terminal and each user equipment, the number of emitting antennas to be used by each network control terminal, and thus obtain at least one of the following advantages: optimizing the selection of the number of emitting antennas, improving system energy efficiency, and meeting the service requirement of the user equipment. In addition, the above determination of the number of emitting antennas is simple with low calculation load and fast processing speed, and thus is easy to be implemented.

Each of the units in the electronic apparatus 200 may be implemented, for example, by one or more processing circuits, and the processing circuits may be implemented, for example, as a chip.

Third Embodiment

In the process of describing the electronic apparatus in the embodiments described above, obviously, some processing and methods are also disclosed. Hereinafter, an overview of the methods is given without repeating some details disclosed above. However, it should be noted that, although the methods are disclosed in a process of describing the electronic apparatus, the methods do not certainly employ or are not certainly executed by the aforementioned components. For example, the embodiments of the electronic apparatus may be partially or completely implemented with hardware and/or firmware, the method described below may be executed by a computer-executable program completely, although the hardware and/or firmware of the apparatus can also be used in the methods.

Figure 4:
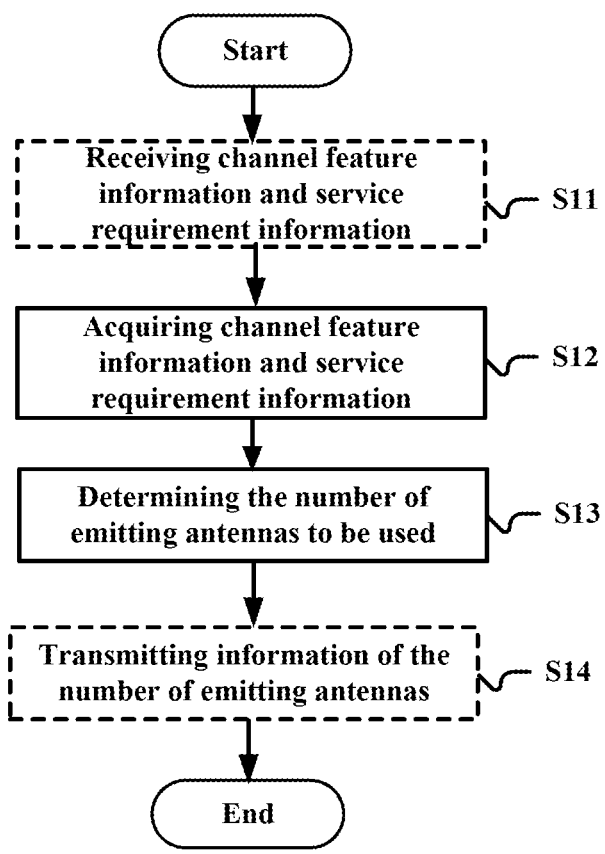
FIG. 4 is a flowchart illustrating a method for a network control terminal according to an embodiment of the present disclosure.

FIG. 4 is a flowchart illustrating a method for a network control terminal according to one embodiment of the present disclosure. The method includes: acquiring channel feature information of channels between a network control terminal and its one or more adjacent network control terminals and user equipment served by respective network control terminals (S12), wherein the network control terminal and its adjacent network control terminals perform downlink data transmission using joint pre-coding; and determining, based on the service requirement information and the channel feature information, the numbers of emitting antennas to be used by the network control terminal and its adjacent network control terminals (S13).

As shown by a dashed line block in FIG. 4, the above method may further include step S11: receiving the channel feature information and the service requirement information of the user equipment from the adjacent network control terminal. For example, in step S11, the above information is received through signaling for interaction between the network control terminals.

As shown by another dashed line block in FIG. 4, the above method may further include step S14: transmitting to an adjacent network control terminal information of the determined number of emitting antennas to be used by the adjacent network control terminal.

As an example, the channel feature information may include one or more of the following: a large scale fading coefficient, a small scale fading coefficient, an angle of arrival for signal, and channel correlation time. The service requirement of the user equipment may be data transmission rate requirement of the user equipment. However, it should be understood that these examples are not restrictive.

In the case that the channel feature information is a large scale fading coefficient, the minimum number of emitting antennas is an analytic function of the service requirement and the large scale fading coefficient.

In one example, in step S13, it is determined, based on the service requirement of particular user equipment among the user equipment served by each network control terminal and the channel feature information, a minimum number of emitting antennas for each network control terminal; and the numbers of emitting antennas to be used by respective network control terminals are jointly optimized according to the minimum number of emitting antennas.

For example, maximizing an overall energy efficiency of a communication system may be used as a target of the optimizing, and the communication system includes the present network control terminal and its served user equipment as well as the adjacent network control terminals and their served user equipment. Alternatively, maximizing an overall energy efficiency of the user equipment served by each network control terminal may be used as a target of the optimizing. Alternatively, maximizing an overall energy efficiency of each network control terminal may be used as a target of the optimizing.

In a case that the joint optimizing is performed in step S13, the number of emitting antennas to be used by each network control terminal may be optimized in turn, for example, under the condition of fixing the numbers of emitting antennas for other network control terminals.

For example, the above particular user equipment may be user equipment with the highest priority level among the user equipment served by the corresponding network control terminal.

Figure 5:
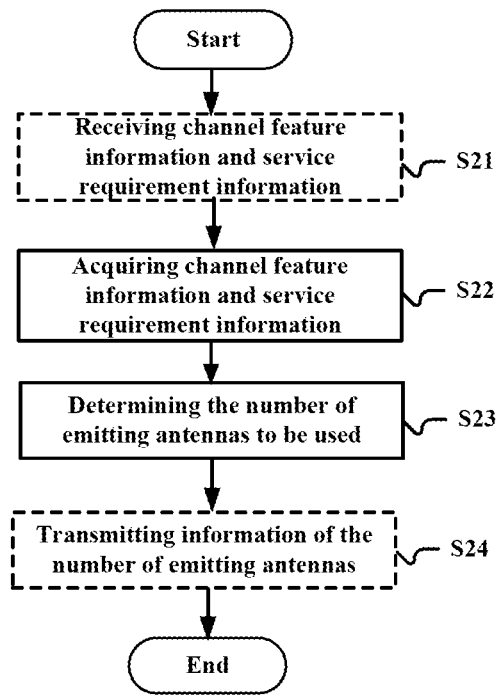
FIG. 5 is a flowchart illustrating a method for a central processing node according to an embodiment of the present disclosure.

FIG. 5 is a flowchart illustrating a method for a central processing node according to one embodiment of the present disclosure. The method includes: acquiring channel feature information of channels between network control terminals which are adjacent to each other and user equipment served by respective network control terminals, and service requirement information of the user equipment (S22), wherein the network control terminals perform downlink data transmission using joint pre-coding; and determining, based on the service requirement information of the user equipment and the channel feature information, the numbers of emitting antennas to be used by respective network control terminals (S23).

As shown by a dashed line block in FIG. 5, the above method may further include step S21: receiving the channel feature information and the service requirement information of the user equipment from the respective network control terminals. As shown in another dashed line block in FIG. 5, the above method may further include step S24: transmitting, to each network control terminal, information of the determined number of emitting antennas to be used by the network control terminal.

It can be seen that the method differs from the method shown in FIG. 4 in the steps of acquiring information and determining the number of emitting antennas on the central processing node, and the performed processing itself is similar to the processing of FIG. 4, and thus the description of each step is not repeated here.

Note that each of the above methods may be used in combination or separately and the details thereof have been described in detail in the first and second embodiments, which will be not repeated herein.

For facilitating the understanding, an exemplary information procedure between the network control terminals and between the network control terminals and the user equipment is described below with reference to FIG. 6, and an exemplary information procedure between the network control terminals and the central processing node and between the network control terminals and the user equipment is described with reference to FIG. 7. It should be understood that the information procedures are for illustrative purposes only and are not restrictive.

Figure 6:
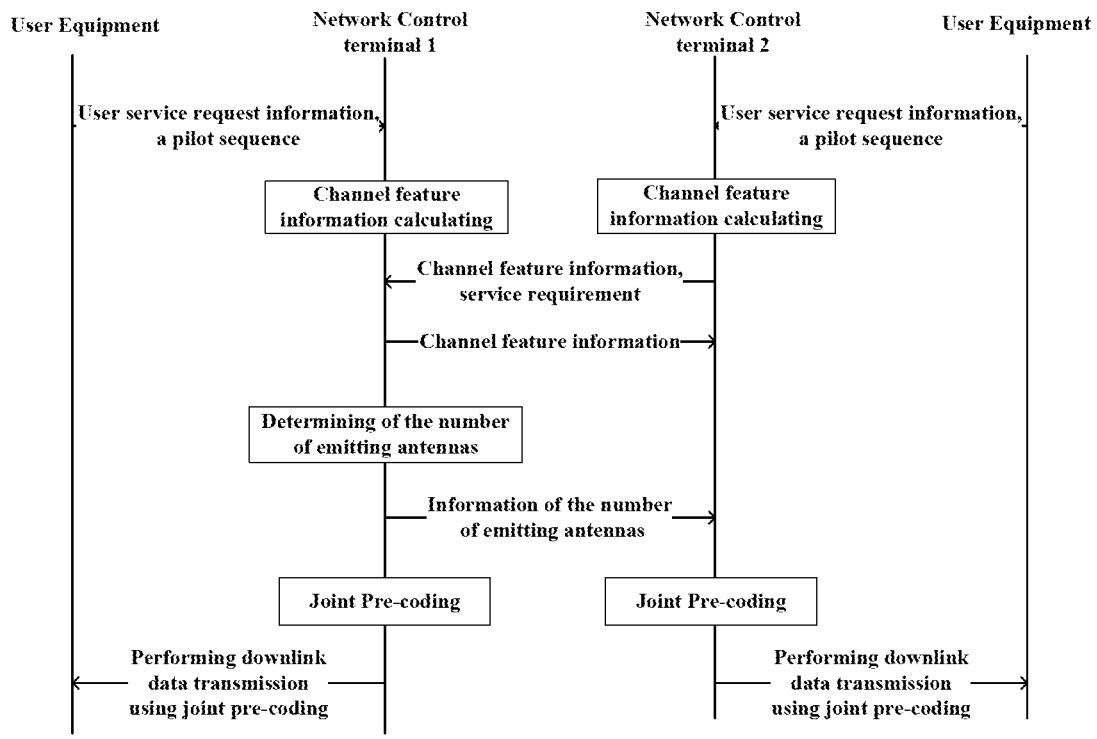
FIG. 6 illustrates an example of an information procedure.

The network control terminal in FIG. 6 may include the electronic apparatus 100 mentioned above or be capable of implementing at least a part of functions of the electronic apparatus 100. For the convenience of description, FIG. 6 illustrates a case where there are two network control terminals which are adjacent to each other as an example. The determination of the number of emitting antennas performed by a network control terminal 1 is described as an example.

First, the user equipment transmits service request information and a pilot sequence to the network control terminal 1. The network control terminal 1 acquires, based on the information, the service requirement of the user equipment served by the network control terminal 1 and the channel feature information of channels between the network control terminal 1 and each of user equipment. It should be noted that when acquiring the channel feature information, the network control terminal 1 not only acquires the channel feature information of channels between the network control terminal 1 and its served user equipment, but also acquires the channel feature information of channels between the network control terminal 1 and the user equipment served by a network control terminal 2. In other words, the user equipment shown in FIG. 6 represents all user equipment served by the network control terminal 1 and the network control terminal 2. In the case that the channel feature information is a large scale fading coefficient, the channel feature information may be expressed as, for example, $\beta_{1k1}$ and $\beta_{2k1}$ as described above.

Meanwhile, similarly, the user equipment also transmits service request information and a pilot sequence to the network control terminal 2. The network control terminal 2 acquires, based on the information, the service requirement of the user equipment served by the network control terminal 2 and the channel feature information of channels between the network control terminal 2 and each of user equipment. In the case that the channel feature information is a large scale fading coefficient, the channel feature information may be expressed as, for example, $\beta_{2k2}$ and $\beta_{1k2}$ as described above. The network control terminal 2 transmits the service requirement and the channel feature information to the network control terminal 1, and the network control terminal 1 also transmits the channel feature information required for the subsequent joint pre-coding to the network control terminal 2.

Subsequently, the network control terminal 1 determines, based on the acquired channel feature information and the service requirement, the numbers of emitting antennas to be used by the network control terminals 1 and 2, for example, by performing the DOTAN strategy mentioned above.

Next, the network control terminal 1 transmits information of the number of emitting antennas to be used by the network control terminal 2 to the network control terminal 2. Then, the network control terminals 1 and 2 perform downlink data transmission using joint pre-coding with the corresponding numbers of emitting antennas.

It should be understood that if the numbers of emitting antennas are determined by the network control terminal 2, the information procedure is similar.

Figure 7:
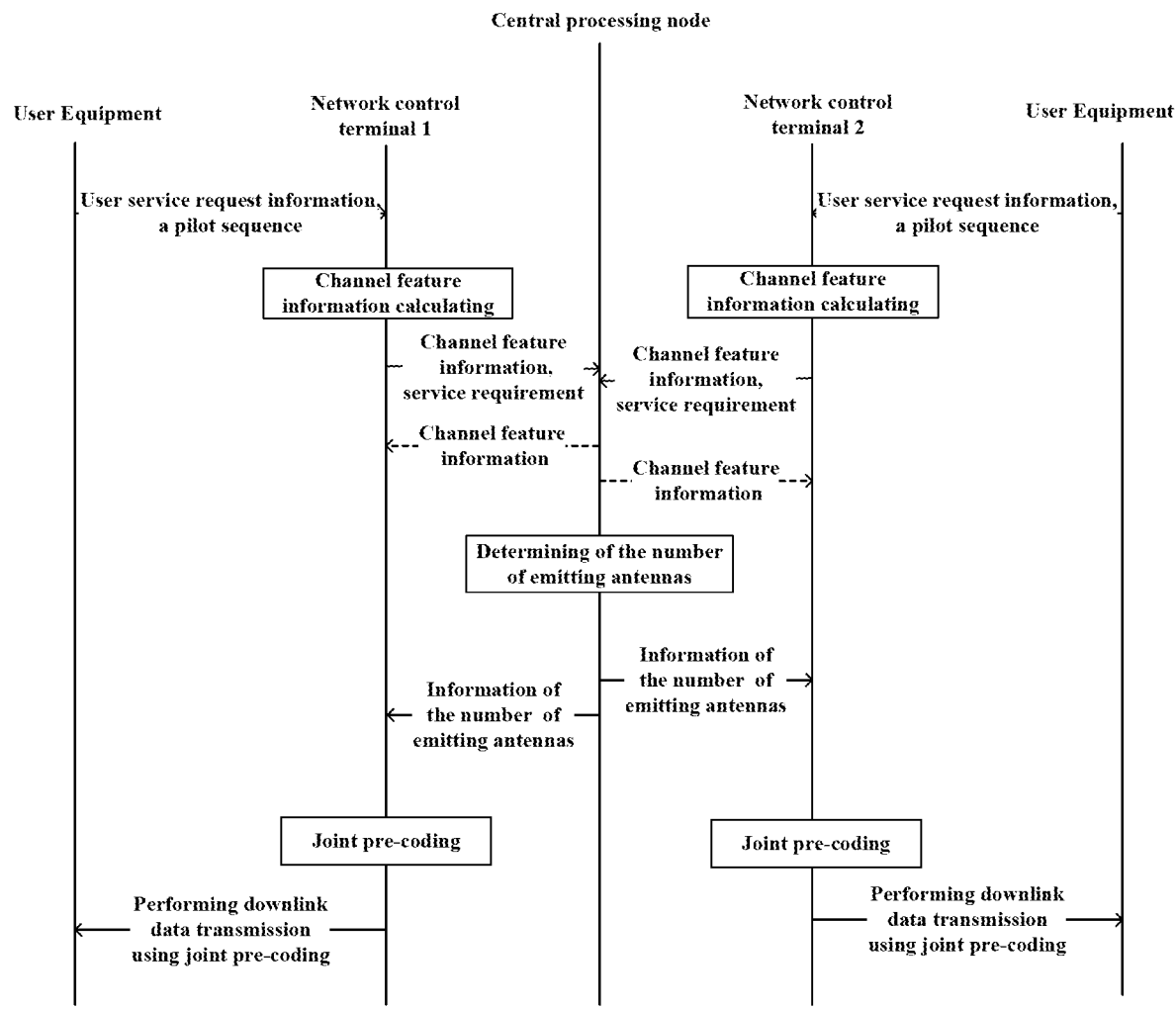
FIG. 7 illustrates another example of an information procedure.

The network control terminal in FIG. 7 may include the electronic apparatus 200 mentioned above or be capable of implementing at least a part of functions of the electronic apparatus 200. For the convenience of description, FIG. 7 illustrates a case where there are two adjacent network control terminals which are adjacent to each other as an example.

In FIG. 7, similarly to FIG. 6, the user equipment transmits service request information and a pilot sequence to the network control terminal 1. The network control terminal 1 acquires, based on the information, the service requirement of its user equipment and the channel feature information. Meanwhile, the user equipment also transmits service request information and a pilot sequence to the network control terminal 2. The network control terminal 2 acquires, based on the information, the service requirement of its user equipment and the channel feature information.

The network control terminals 1 and 2 provide the service requirement and channel feature information to the central processing node. Since channel feature information of other network control terminals is required in the subsequent joint pre-coding, the central processing node may provide the channel feature information of the network control terminal 1 to the network control terminal 2, and provide the channel feature information of the network control terminal 2 to network control terminal 1. The process is optional. For example, the channel feature information may also be delivered through direct information interchange between the network control terminals.

Subsequently, the central processing node determines, based on the acquired channel feature information and the service requirement information of respective network control terminals, the numbers of emitting antennas to be used by respective network control terminals, for example, by performing the DOTAN strategy, Next, the central processing node respectively transmits to the network control terminals 1 and 2 information of the number of emitting antennas to be used by the network control terminals 1 and 2. Then, the network control terminals 1 and 2 perform downlink data transmission using joint pre-coding with the corresponding numbers of emitting antennas.

To sum up, according to the electronic apparatus and method of the present disclosure, the numbers of emitting antennas to be used by respective network control terminals may be jointly determined, based on the service requirement of the user equipment and the channel feature information, and thus can obtain at least one of the following advantages: optimizing the selection of the number of emitting antennas, improving system energy efficiency, and meeting the service requirement of the user equipment. In addition, the above determination of the number of emitting antennas is simple with low calculation load and fast processing speed, and thus is easy to be implemented.

Application Example

The technology of the present disclosure may be applied to various products. For example, the electronic apparatus 200 may be implemented as any type of server, such as a tower server, a rack server, and a blade server. The electronic apparatus 200 may be a control module mounted on a server (such as an integrated circuit module including a single wafer, and a card or a blade inserted into a slot of the blade server).

For example, the network control terminal may be a base station which may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function.

I. Application Example Regarding Server

Figure 8:
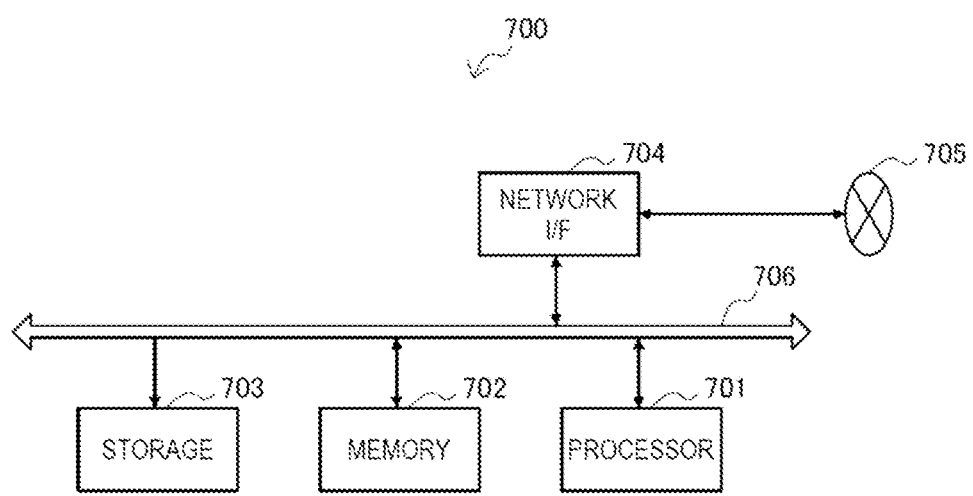
FIG. 8 is a block diagram illustrating an example of a schematic configuration of a server.

FIG. 8 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a memory medium, such as a semiconductor memory and a hard disc.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703 and the network interface 704 together. The bus 706 may include two or more buses (such as a high speed bus and a low speed bus) each of which has different speed.

In the sever 700 shown in FIG. 8, the information acquiring unit 201 and the determining unit 202 described in FIG. 3 may be implemented by the processor 701. For example, the processor 701 may implement the determination of the number of emitting antennas to be used by each network control terminal by performing the functions of the information acquiring unit 201 and the determining unit 202.

II. Application Example Regarding Base Station

First Application Example

Figure 9:
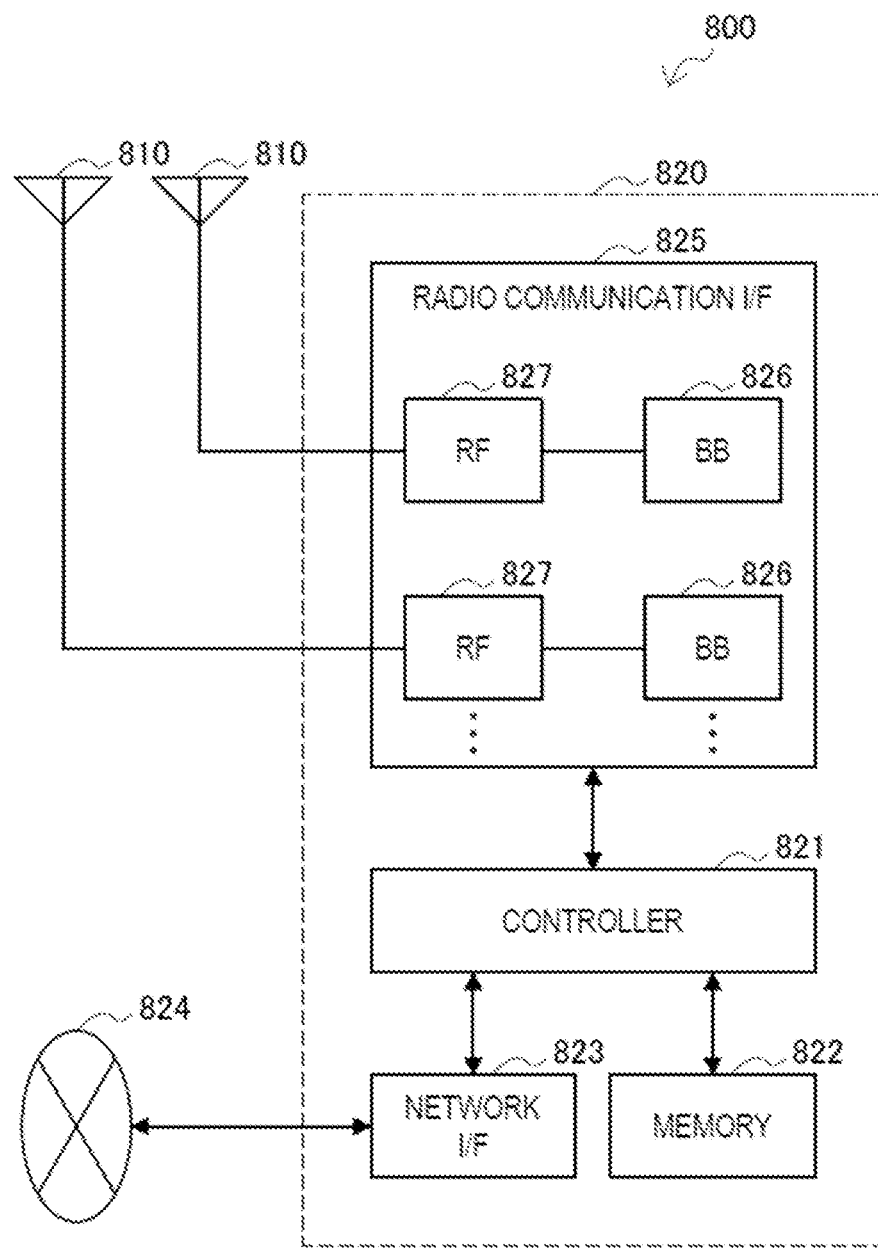
FIG. 9 is a block diagram illustrating a first example of a schematic configuration of an evolved Node B (eNB) to which the technology of the present disclosure may be applied.

FIG. 9 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in a Multiple Input Multiple Output (MIMO) antenna), and is used for the base station apparatus 820 to transmit and receive radio signals. The eNB 800 may include the multiple antennas 810, as illustrated in FIG. 9. For example, the multiple antennas 810 may be compatible with multiple frequency bands used by the eNB 800. Although FIG. 9 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme (such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 9. For example, the multiple BB processors 826 may be compatible with multiple frequency bands used by the eNB 800. The radio communication interface 825 may include the multiple RF circuits 827, as illustrated in FIG. 9. For example, the multiple RF circuits 827 may be compatible with multiple antenna elements. Although FIG. 9 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 9, the transceiving unit 103 described with reference to FIG. 1 may be implemented by the radio communication interface 825. At least a part of the functions may also be implemented by the controller 821. For example, the controller 821 may implement the determination of the number of emitting antennas to be used by each network control terminal by performing the functions of the information acquiring unit 101 and the determining unit 102.

Second Application Example

Figure 10:
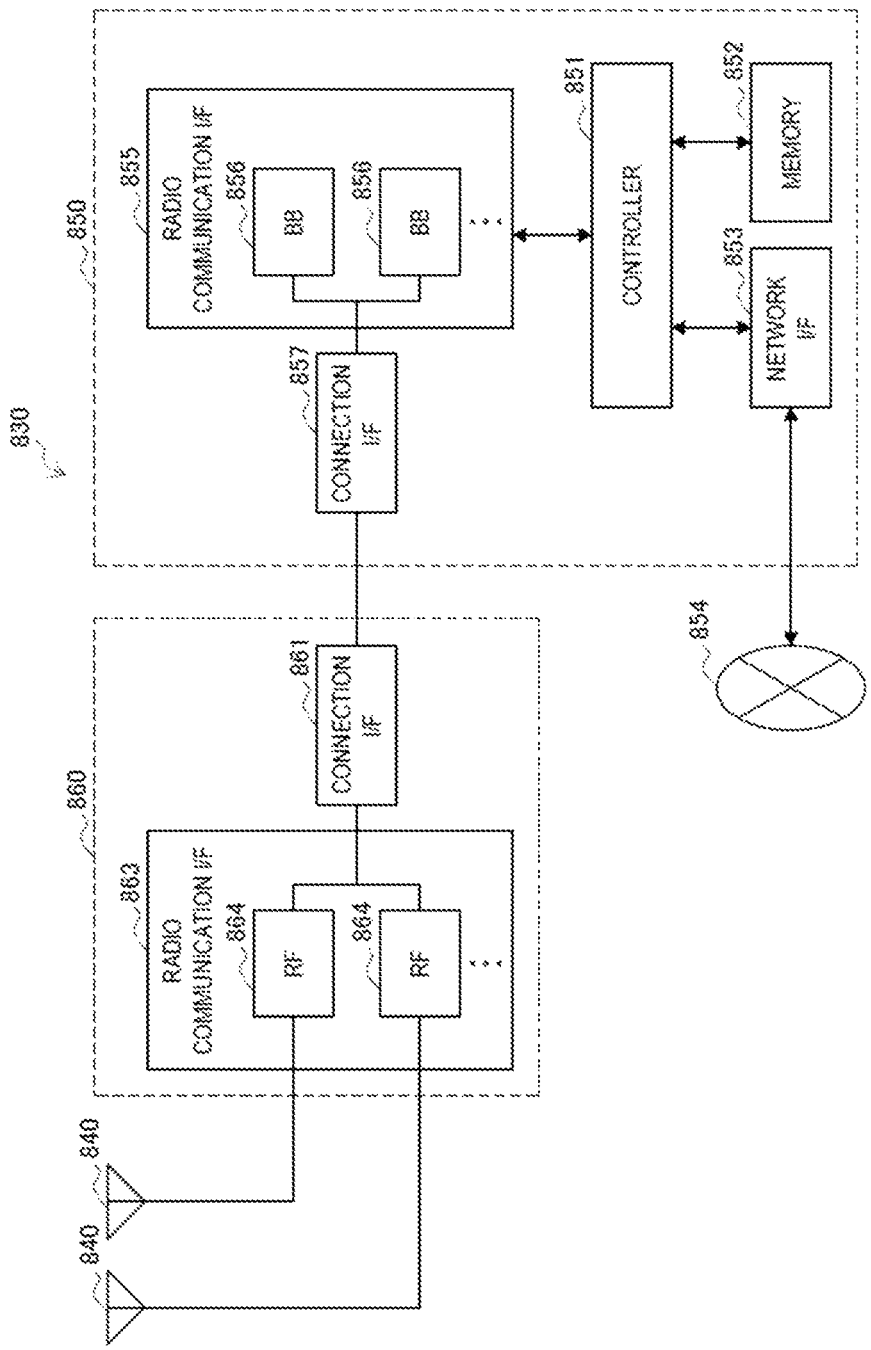
FIG. 10 is a block diagram illustrating a second example of a schematic configuration of an eNB to which the technology according to the present disclosure may be applied.

FIG. 10 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 10. For example, the multiple antennas 840 may be compatible with multiple frequency bands used by the eNB 830. Although FIG. 10 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 10.

The radio communication interface 855 supports any cellular communication scheme (such as LTE and LTE-Advanced), and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 10, except the BB processor 856 is connected to the RF circuit 864 of the RRH 860 via the connection interface 857. The radio communication interface 855 may include the multiple BB processors 856, as illustrated in FIG. 10. For example, the multiple BB processors 856 may be compatible with multiple frequency bands used by the eNB 830. Although FIG. 10 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 10. For example, the multiple RF circuits 864 may support multiple antenna elements. Although FIG. 10 illustrates the example in which the radio communication interface 863 includes the multiple RF circuits 864, the radio communication interface 863 may also include a single RF circuit 864.

In the eNB 830 illustrated in FIG. 10, the transceiving unit 103 described with reference to FIG. 1 may be implemented by the radio communication interface 855 and/or the radio communication interface 863. At least a part of the functions may also be implemented by the controller 851. For example, the controller 851 may implement the determination of the number of emitting antennas to be used by each network control terminal by performing the functions of the information acquiring unit 101 and the determining unit 102.

It should be understood that the above application examples are not restrictive, but are merely examples given for ease of the understanding.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1100 shown in FIG. 11) from a storage medium or network, wherein the computer is capable of implementing various functions when installed with various programs.

Figure 11:
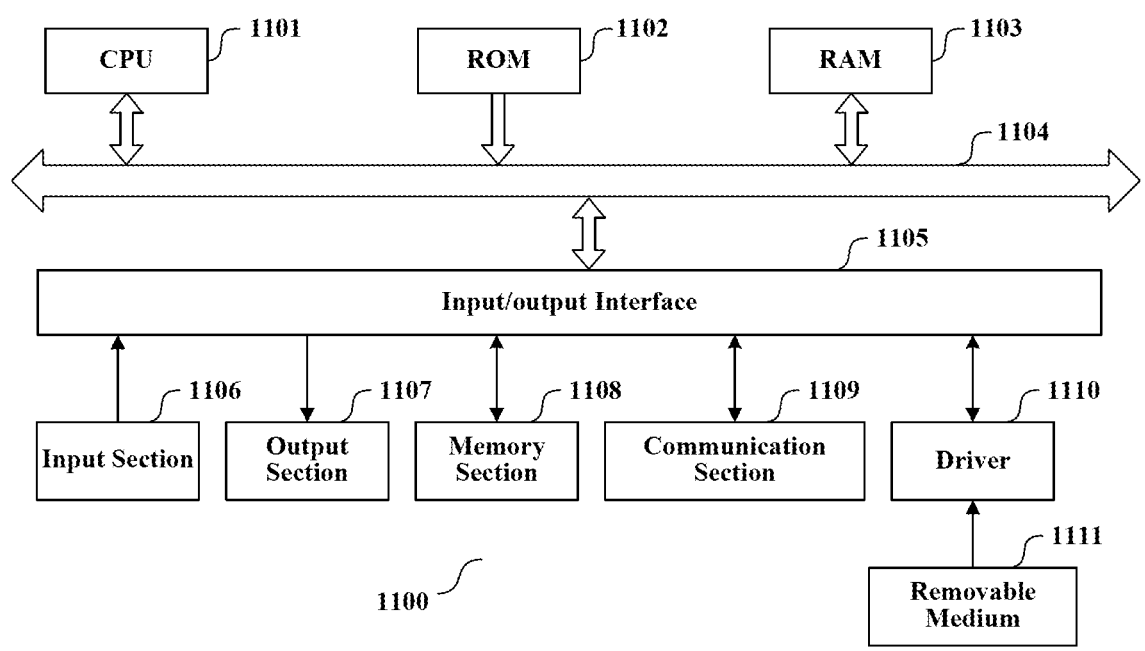
FIG. 11 is a block diagram of an exemplary block diagram illustrating the structure of a general purpose personal computer capable of realizing the method and/or device and/or system according to the embodiments of the present invention.

In FIG. 11, a central processing unit (CPU) 1101 executes various processing according to a program stored in a read-only memory (ROM) 1102 or a program loaded to a random access memory (RAM) 1103 from a memory section 1108. The data needed for the various processing of the CPU 1101 may be stored in the RAM 1103 as needed. The CPU 1101, the ROM 1102 and the RAM 1103 are linked with each other via a bus 1104. An input/output interface 1105 is also linked to the bus 1104.

The following components are linked to the input/output interface 1105: an input section 1106 (including keyboard, mouse and the like), an output section 1107 (including displays such as a cathode ray tube (CRT), a liquid crystal display (LCD), a loudspeaker and the like), a memory section 1108 (including hard disc and the like), and a communication section 1109 (including a network interface card such as a LAN card, modem and the like). The communication section 1109 performs communication processing via a network such as the Internet. A driver 1110 may also be linked to the input/output interface 1105, if needed. If needed, a removable medium 1111, for example, a magnetic disc, an optical disc, a magnetic optical disc, a semiconductor memory and the like, may be installed in the driver 1110, so that the computer program read therefrom is installed in the memory section 1108 as appropriate.

In the case where the foregoing series of processing is achieved through software, programs forming the software are installed from a network such as the Internet or a memory medium such as the removable medium 1111.

It should be appreciated by those skilled in the art that the memory medium is not limited to the removable medium 1111 shown in FIG. 11, which has program stored therein and is distributed separately from the apparatus so as to provide the programs to users. The removable medium 1111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1102 and the memory section 1108 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for a network control terminal, comprising:
processing circuitry, configured to:
acquire channel feature information of channels between a network control terminal and its one or more adjacent network control terminals and user equipment served by respective network control terminals, and service requirement information of the user equipment served by respective network control terminals, wherein, the network control terminal and its adjacent network control terminals perform downlink data transmission using joint pre-coding;
determine, based on the service requirement information and the channel feature information, the numbers of emitting antennas to be used by the network control terminal and its adjacent network control terminals,
determine, based on the service requirement of particular user equipment among the user equipment served by each network control terminal and the channel feature information, a minimum number of emitting antennas for each network control terminal; and
jointly optimize the numbers of emitting antennas to be used by respective network control terminals according to the minimum number of emitting antennas.

2. The electronic apparatus according to claim 1, wherein, the channel feature information of channels between the adjacent network control terminal and the user equipment served by respective network control terminals, and the service requirement of the user equipment served by the adjacent network control terminal are acquired through information interchange between network control terminals.

3. The electronic apparatus according to claim 1, wherein, the processing circuitry is configured to maximize overall energy efficiency of a communication system as a target of the optimizing, the communication system comprising the network control terminal and its served user equipment as well as the adjacent network control terminals and their served user equipment; or
maximize an overall energy efficiency of the user equipment served by respective network control terminals as a target of the optimizing; or
maximize an overall energy efficiency of respective network control terminal as a target of the optimizing: or
under the condition of fixing the numbers of emitting antennas for other network control terminals, optimize the number of emitting antennas to be used by each network control terminal in turn.

4. The electronic apparatus according to claim 1, wherein, the channel feature information comprises one or more of the following: a large scale fading coefficient, a small scale fading coefficient, an angle of arrival for signal, and channel correlation time.

5. The electronic apparatus according to claim 1, wherein, the service requirement of the user equipment is data transmission rate requirement of the user equipment.

6. The electronic apparatus according to claim 1, wherein, the particular user equipment is user equipment with the highest priority level among the user equipment served by the corresponding network control terminal.

7. The electronic apparatus according to claim 1, wherein, the channel feature information is a large scale fading coefficient, and the minimum number of emitting antennas is an analytic function of the service requirement and the large scale fading coefficient.

8. The electronic apparatus according to claim 1, further comprising:
a transceiver, configured to receive the service requirement information of the user equipment and the channel feature information from the adjacent network control terminal,
wherein, the transceiver is configured to receive the service requirement information of the user equipment and the channel feature information through signaling for interaction between the network control terminals.

9. The electronic apparatus according to claim 8, wherein, the transceiver is further configured to transmit to an adjacent network control terminal information of the determined number of emitting antennas to be used by the adjacent network control terminal.

10. An electronic apparatus for a central processing node, comprising:
processing circuitry, configured to:
acquire channel feature information of channels between network control terminals which are adjacent to each other and user equipment served by respective network control terminals, and service requirement information of the user equipment, wherein, the network control terminals perform downlink data transmission using joint pre-coding;
determine, based on the service requirement information of the user equipment and the channel feature information, the numbers of emitting antennas to be used by respective network control terminals,
determine, based on the service requirement of particular user equipment among the user equipment served by each network control terminal and the channel feature information, a minimum number of emitting antennas for each network control terminal; and
jointly optimize the numbers of emitting antennas to be used by respective network control terminals according to the minimum number of emitting antennas.

11. The electronic apparatus according to claim 10, wherein, the processing circuitry is configured to maximize an overall energy efficiency of a communication system as a target of the optimizing, the communication system comprising the respective network control terminals and their served user equipment; or
maximize an overall energy efficiency of the user equipment served by each network control terminal as a target of the optimizing; or wherein, the processing circuitry is configured to maximize an overall energy efficiency of each network control terminal as a target of the optimizing; or under the condition of fixing the numbers of emitting antennas for other network control terminals, optimize the number of emitting antennas to be used by each network control terminal in turn.

12. The electronic apparatus according to claim 10, wherein, the channel feature information comprises one or more of the following: a large scale fading coefficient, a small scale fading coefficient, an angle of arrival for signal, and channel correlation time.

13. The electronic apparatus according to claim 10, wherein, the service requirement of the user equipment is data transmission rate requirement of the user equipment.

14. The electronic apparatus according to claim 10, wherein, the particular user equipment is user equipment with the highest priority level among the user equipment served by the corresponding network control terminal.

15. The electronic apparatus according to claim 10, further comprising:
a transceiver, configured to receive the service requirement information of the user equipment and the channel feature information from the respective network control terminals,
wherein, the transceiver is further configured to transmit to each network control terminal information of the number of emitting antennas to be used by the network control terminal.

16. A method for a network control terminal, comprising:
acquiring channel feature information of channels between a network control terminal and its one or more adjacent network control terminals and user equipment served by respective network control terminals, and service requirement information of the user equipment served by respective network control terminals, wherein, the network control terminal and its adjacent network control terminals perform downlink data transmission using joint pre-coding;
determining, based on the service requirement information and the channel feature information, the numbers of emitting antennas to be used by the network control terminal and its adjacent network control terminals,
determining, based on the service requirement of particular user equipment among the user equipment served by each network control terminal and the channel feature information, a minimum number of emitting antennas for each network control terminal; and
jointly optimizing the numbers of emitting antennas to be used by respective network control terminals according to the minimum number of emitting antennas.

17. A method for a central processing node, comprising:
acquiring channel feature information of channels between network control terminals which are adjacent to each other and user equipment served by respective network control terminals, and service requirement information of the user equipment, wherein, the network control terminals perform downlink data transmission using joint pre-coding;
determining, based on the service requirement information of the user equipment and the channel feature information, the numbers of emitting antennas to be used by respective network control terminals,
determining, based on the service requirement of particular user equipment among the user equipment served by each network control terminal and the channel feature information, a minimum number of emitting antennas for each network control terminal; and
jointly optimizing the numbers of emitting antennas to be used by respective network control terminals according to the minimum number of emitting antennas.

* * * * *